Sept. 27, 1938.   C. F. MILLER   2,131,254
METHOD AND APPARATUS FOR MANUFACTURE OF ELECTRODES
FOR ELECTRON DISCHARGE TUBES
Filed Feb. 10, 1937   2 Sheets-Sheet 1
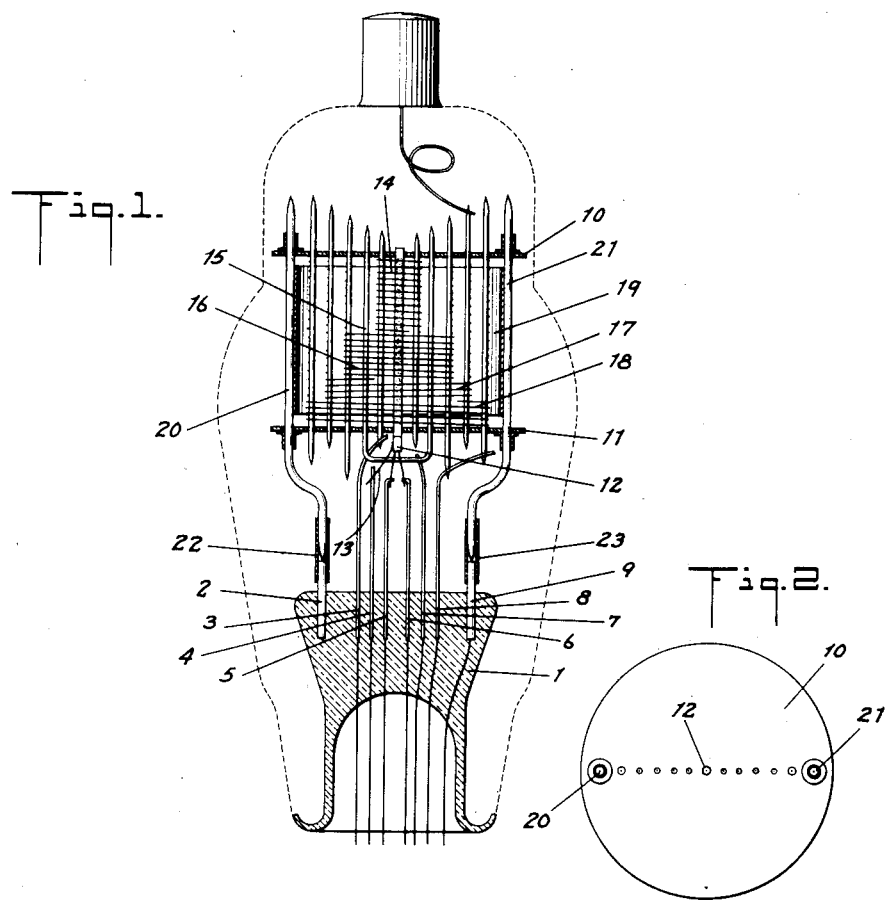
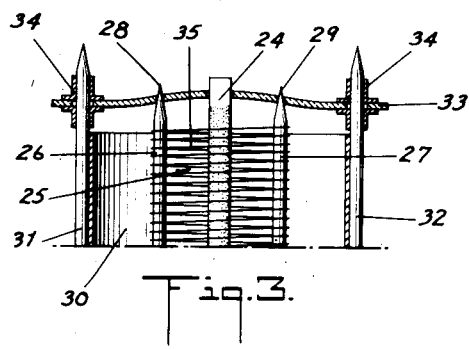
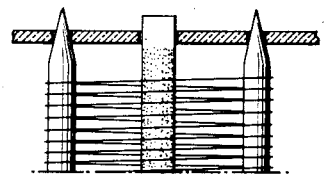
Carl F. Miller
INVENTOR
BY John J. Rogan
ATTORNEY Sept. 27, 1938.  C. F. MILLER  2,131,254
METHOD AND APPARATUS FOR MANUFACTURE OF ELECTRODES
FOR ELECTRON DISCHARGE TUBES
Filed Feb. 10, 1937   2 Sheets—Sheet 2

Carl F. Miller
INVENTOR

BY John J. Kogan
ATTORNEY

Patented Sept. 27, 1938

2,131,254

UNITED STATES PATENT OFFICE 2,131,254

METHOD AND APPARATUS FOR MANUFACTURE OF ELECTRODES FOR ELECTRON DISCHARGE TUBES

Carl F. Miller, Emporium, Pa., assignor to Hygrade Sylvania Corporation, Salem, Mass., a corporation of Massachusetts Application February 10, 1937, Serial No. 125,014

12 Claims. (Cl. 250—27.5)

This invention relates to electric discharge tubes and more particularly to improvements in electrode supports and methods of manufacture thereof.

A principal object of the invention relates to an electrode of the type employing one or more side rods or supports, which are so shaped as to facilitate the assembly of the electrode in the usual perforated or recessed insulator spacer.

Another object is to provide a radio tube electrode employing a side rod or support so shaped as to reduce the possibility of microphonic vibrations of the electrode with respect to other parts of the tube.

A feature of the invention relates to an improved form of electrode side rod or support and also the method and apparatus for manufacturing the same.

Another feature relates to an electrode having a pointed or tapered side rod or support which cooperates with perforated insulator discs in such a way as to clamp the electrode between the discs while maintaining the discs spaced from the ends of the electrode proper.

A further feature relates to an improved method of forming concentric points at the ends of an electrode side rod or support.

Other features and advantages not specifically enumerated will be apparent after a consideration of the following detailed descriptions and the appended claims.

In the drawings, Fig. 1 is an elevational view, partly in section of a typical radio tube embodying features of the invention.

Fig. 2 is a top plan view of the mount of Fig. 1.

Fig. 3 represents a modification of the invention shown in Fig. 1.

Fig. 4 represents a further modification of the invention.

Figure 5:
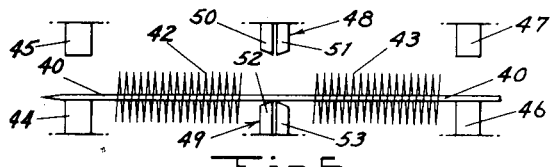
Figs. 5 to 11 are schematic diagrams explaining one preferred method of pointing the ends of an electrode side rod according to the invention.

Referring more particularly to Fig. 1 there is shown in dotted outline a conventional radio tube envelope and while the tube is shown in Fig. 1 of the glass envelope type, it will be understood that it is equally well applicable to the so-called metal tubes or composite metal-glass tubes. The numeral 1 represents the press or base of the tube wherein are sealed the various lead-in and support wires 2 to 9 inclusive. Adapted to be connected to the lead-in wires is any well-known form of radio tube mount and while the drawings show a mount of the "heptode" type having an electron emitting cathode surrounded by five successive grids and an anode, it will be understood that this is done merely for illustration and the invention can be embodied in any other type of radio tube having a greater or less number of electrodes. Preferably, although not necessarily, the mount is of the so-called unitary type, that is, one wherein all the electrodes are fastened together in predetermined spaced relation as a unit prior to being connected to the various lead-in wires. For this purpose it is the usual practice to employ a pair of insulator spacer members or discs 10, 11 between which the various electrodes are supported. As shown in the drawings, the members 10, 11 are in the form of discs of a suitable insulating material such for example as sheet mica having a series of perforations to receive the cathode and the various electrode side rods.

The cathode 12 extends through the central perforations in the two discs 10, 11 and may be either supported by said discs as disclosed for example in Patent No. 1,974,916 or if desired it may be supported by a tab 13 welded to the wire 4 as well as by the heater filament which has its ends welded to wires 5, 6. Surrounding the cathode are the grids 14 to 18 and the plate or anode 19. The grids 14, 16, 17 and 18 may be of any well-known construction but preferably each grid is in the form of a fine wire or series of fine wires supported by, and attached to, respective metal uprights or side rods. In order to avoid ambiguity in the drawings the fine wires for the various grids are only partly shown, but it will be understood that all the grids are substantially coextensive in length. The grid 15 is shown as consisting merely of the vertical uprights or side rods which may be formed from a single length of wire bent to U-shape as shown. It will be understood however that if desired fine wire laterals may be provided on the rods of grid 15 similar to the other grids. The plate or anode is likewise attached to a pair of side rods 20, 21 which have their lower ends inwardly offset and fastened to the support wires 2 and 9.

While the drawings show the side rods 20, 21 fastened to the wires 2 and 9 through the intermediary of the coupling sleeves 22, 23 it will be understood that the side rods may be welded or otherwise fastened directly to the wires 2 and 9.

The spacers 10 and 11 being of sheet mica are inclined to chip or crack when assembled over the ordinary side rods. This is particularly true in the case of those side rods which are cut to length by shearing members, because the cut ends are usually irregular and in some cases present a knife-like edge to the mica. In some cases the cutting operation has a tendency to flatten the ends of the side rods at the cutting point. Consequently when the perforated mica discs are assembled over such a sheared side rod, the end of the rod cuts into or chips the edge of the mica around the perforation. If the perforations are enlarged to take care of this condition, then there is the danger of mica rattle and microphonic noises. Furthermore with the ordinary sheared or cut side rods, great care must be exercised in aligning the mica perforations with the ends of the side rods in order to prevent the side rods damaging the mica. I have found that by providing the side rods with concentric pointed ends, the above difficulties are overcome. Thus as shown in Fig. 1 each side rod has its ends previously tapered to a concentric point in which case the perforations in the mica spacers may, if desired, be made a tight fit with respect to the side rods. Furthermore, since the ends of the side rods are concentrically pointed it is much easier to assemble the mica spacers in place, since the tapered ends of the side rods to a certain extent guide the side rods into the perforations.

In the embodiment of Fig. 1, the side rods are of such a cross section as to extend bodily through the mica spacers. In certain cases it may be desirable to make the perforations in the mica smaller than the diameter of the side rods. Thus there is shown in Fig. 3 a part of the upper end of a tube mount comprising a central cathode 24 surrounded by a wire wound grid 25 having a pair of side rods 26, 27 with concentric pointed ends 28, 29. Surrounding the grid is a plate or anode 30 which is carried by two side rods 31, 32. The mica spacer 33 is held in place on the side rods 31, 32 by means of metal eyelets 34 welded to said side rods. The perforations in the mica member 33 are preferably smaller than the diameter of the side rods 26, 27 so that only a part of the pointed ends 28, 29 extend through said perforations. When the member 33 is sufficiently thin it is capable of being flexed by pressure of the ends 28, 29 thereagainst, it being understood that the lower ends of the side rods 26, 27 are likewise pressed against a mica member similar to member 33. By this arrangement, the grid is resiliently clamped between the upper and lower mica members, and said members are held out of contact with the end turns 35 of the grid.

It will be understood of course that the mica instead of being flexible may be comparatively rigid or of ceramic material so that it retains its flat shape when assembled on the pointed ends of the side rods as shown for example in Fig. 4.

While the ends of the various side rods may be provided with the concentric points in any suitable manner I prefer to form them by a combined heating and stretching operation. Thus referring to Figs. 5-11, there is shown in diagrammatic form a typical manner of forming the pointed side rods. Referring more particularly to Fig. 5 there is shown a conventional grid strip as it is produced by well-known grid winding machines and consisting of a pair of side rods 40, 41 around which are supported the fine wire grids 42, 43, it being understood that the winding is skipped at regular intervals to allow the side rods to be severed. In order to effect the severing and pointing, there are provided two sets of clamping members 44, 45 and 46, 47; and a pair of heating electrodes 48, 49 each heating electrode consisting of a pair of slightly spaced members, 50, 51 and 52, 53. Preferably the opposing faces of the electrodes are tapered as shown.

Figure 6:
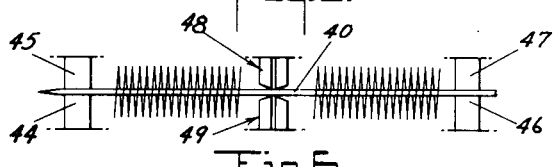
Figure 7:
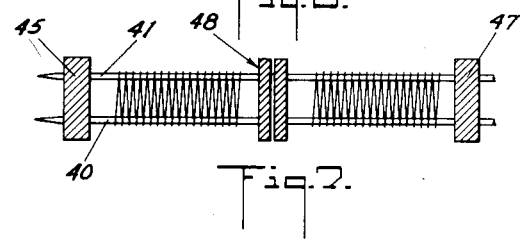
Figure 8:
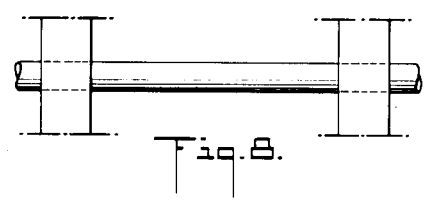
Figure 9:
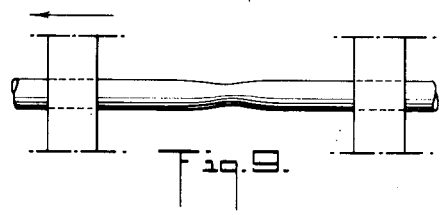
Figure 10:
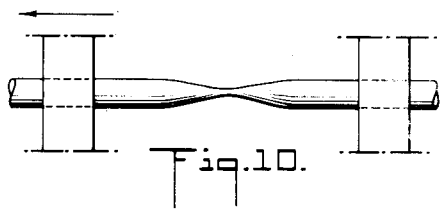
Figure 11:
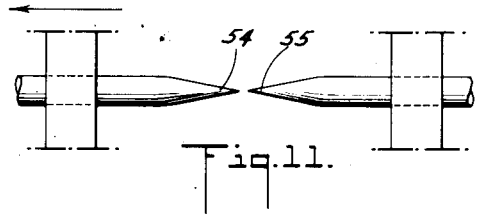

When the grid strip is positioned as shown in Fig. 5, the clamps 44—45 and 46—47 are closed and also the electrodes 48, 49 are brought into contact with the side rods as illustrated in Figs. 6 and 7, Fig. 7 being a top plan view of Fig. 6. The electrodes 48, 49 are connected to a suitable source of current so that the circuit therebetween is completed by contact with the side rods. Because of the relatively higher resistance of the material of the side rods, heat is generated adjacent the electrodes so that the side rods gradually soften at those regions. While the side rods are in their localized softened condition, as indicated in Figs. 9 and 10 either or both of the clamps are moved in the direction of the arrow to exert a longitudinal pull on the side rods. This pulling action is continued until, as indicated in Fig. 11, the side rods separate, thus forming the concentric tapered pointed ends 54, 55, and severing the grid strip into the individual grid units. It will be understood of course that while the drawings show only one pair of clamps and one pair of electrodes severing a grid strip into two grid units, the parts may be duplicated so that an elongated grid strip may be severed simultaneously to produce more than two grid units with the pointed side rods. Likewise while the heating of the side rods is preferably achieved by the heat due to the IR drop in the side rod material, it will be understood that the heating electrodes may be moved into close spaced relation to the side rods instead of actually contacting the same, and an arc producing current passed through the electrodes so that the side rods are heated locally by the heat of the arc. If desired a high frequency arc may be produced between the electrodes for the purpose of heating the latter. Furthermore it is not necessary to employ a pair of electrodes for this purpose since the material of the side rod itself may act as one of the electrodes as will be obvious to those familiar with the art. In any event it is preferred that the duration of the heating whether resistive or arc-produced, be accurately timed by any well-known timing mechanism. For a detailed description of such a timing mechanism reference may be had to application Serial No. 22,499, filed May 21, 1935.

Figure 12:
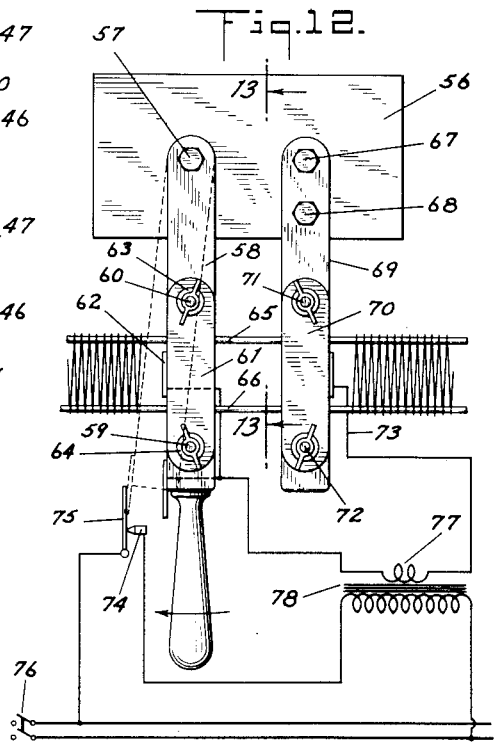
Fig. 12 is a composite schematic diagram of an apparatus for pointing electrode side rods.
Figure 13:
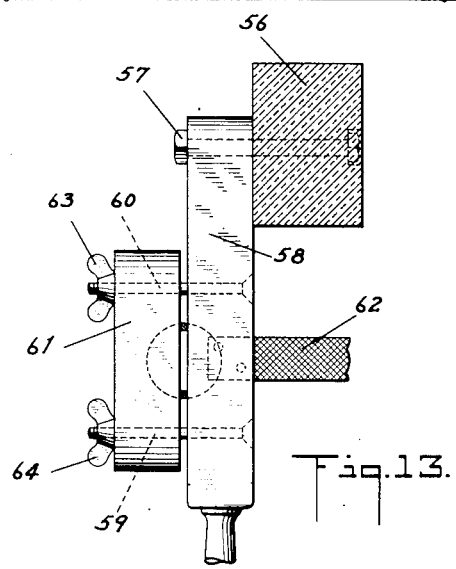
Fig. 13 is a side view of part of the apparatus shown in Fig. 12.

Referring to Figs. 12 and 13 there is shown a typical apparatus and circuit which may be used in severing and pointing the side rods. In these figures the numeral 56 represents a block of suitable insulating material. Pivotally attached to the block 56 by member 57 is a metal arm 58 carrying two threaded members 59, 60. Associated with the arm 58 and adapted to slide over the members 59, 60 is a clamping block 61. A flexible connecting wire or strip 62 is connected to arm 58. Wing nuts 63, 64 are provided on the members 59, 60 so as to enable the side rods 65, 66 of a grid strip to be clamped between members 58 and 61. Fixedly attached to block 56 by bolts 67, 68 is a similar clamping arrangement comprising the clamp members 69, 70 and the clamping nuts 71, 72. A connecting wire or cable 73 is connected to the member 69.

For the purpose of breaking the arc-producing or heating circuit after the severance of the side rods, there is provided a fixed contact 74 and a cooperating movable contact 75 which are held separated when the arm 58 is in the dotted position as shown in Fig. 12. Preferably, although not necessarily, a time controlled supply switch or relay 76 is provided to control the application of the heating current. The manner of using the device of Fig. 12 is along the following lines. With the switch 76 open and with the clamp members 61 and 70 open, the grid strip is positioned as shown in Figs. 12 and 13. The members 61 and 70 are then clamped against the side rods 65, 66, it being understood that the arm 58 is in the position shown in full lines. The switch 76 is then closed and after a suitable timed interval the arm 58 is swung to its dotted line position in the direction of the arrow thus subjecting the side rods to a gradual pull while they are being heated by means of the current flowing through the secondary winding 77 of the transformer 78. It will be understood of course that the heating current and time of application are so adjusted that when the arm 58 is moved to its left-hand position to open the contacts 74, 75 the side rods will have been sufficiently softened to effect their separation and the formation of the concentric tapered pointed ends as explained in connection with Fig. 11. If desired, the contacts 74, 75 may be so positioned with respect to the arm 58 that so long as the side rods are still integral, as for example in the condition illustrated in Fig. 10, the contacts 74, 75 are closed, but upon severance of the side rods, the arm 58 is then free to move to its extreme left-hand position to open the contacts 74, 75 and thus cut off the heating current.

While it is preferred to form the pointed ends on the side rods by simultaneously heating and pulling the same, it will be understood that the heating may be effected first, to bring the side rods into the softened condition by means of an accurately timed heating current, and then with the rods in softened condition the pull may be exerted to sever and point the side rods. Other changes and modifications may be made in the method and apparatus without departing from the spirit and scope of the invention.

What I claim is:

1. In combination, an electrode for a radio tube and the like, a support post for said electrode, said post having at least one end tapered to a point, and a member having a perforation through which said tapered end partially passes, the edge of said perforation being engaged by the taper on said end.

2. The combination according to claim 1 in which the point at the end of the side rod is concentric with the side rod.

3. In combination, an electrode for a radio tube and the like, a pair of side rods attached to said electrode, each of said side rods having at least one end provided with a concentric tapered point, and a spacer member having perforations through which said tapered ends partially pass, the edges of the perforations being engaged by the tapers on said ends.

4. The combination according to claim 2 in which the side rods have their opposite ends each provided with a concentric tapered point.

5. A grid electrode for a radio tube and the like comprising a plurality of transverse grid wires, a side rod to which said wires are fastened, said side rod having at least one end provided with a concentric tapered point, and an insulator spacer member having a perforation through which said tapered end partially passes, the edges of said perforation engaging the taper on said end.

6. In a radio tube mount the combination of an electrode having at least one side rod, a pair of insulator members between which said electrode is mounted, a perforation in each of said members to receive the ends of said side rod, one end of said side rod having the form of a concentric tapered point, the perforation in one of said members being smaller than the diameter of said rod so that only part of said pointed end protrudes therethrough.

7. In a radio tube mount the combination of an electrode having at least one side rod, a pair of insulator members between which said electrode is mounted, a perforation in each of said members in alignment with said side rod, said side rod having pointed ends, and said perforations being smaller than the diameter of the side rod so that only the pointed ends of the side rods extend therethrough.

8. In a radio tube mount the combination of an electrode, a pair of side rods to which said electrode is fastened, said side rods having their upper ends tapered to a point, a flexible insulator member adjacent the upper end of said electrode said member having perforations in alignment with the tapered ends of said side rods and through which only the tapered portions pass.

9. In a radio tube mount the combination of a grid electrode having a pair of side rods, another electrode having a pair of side rods, said electrodes surrounding each other, a sheet of flexible insulation mounted adjacent the upper ends of said electrodes, means to fasten said sheet rigidly to the side rods of the outer electrode, the side rods of the inner electrode having tapered ends extending only partly through said sheet.

10. In a radio tube mount the combination of a grid electrode having transverse grid wires and a pair of tapered-end side rods to which said wires are fastened, another electrode surrounding said grid electrode, and means for clamping said grid electrode in position, the last-mentioned means including an insulator rigidly fastened adjacent one end of said other electrode and having a pair of perforations in alignment with said side rods said perforations being smaller than the diameter of the side rods whereby only the tapered portions of the side rods extend therethrough.

11. A radio tube mount according to claim 10 in which the insulator is of a mica sheet which is partly flexible.

12. A radio tube mount according to claim 10 in which the insulator consists of a ceramic body.

CARL F. MILLER.